United States Patent
Brandwine et al.

(10) Patent No.: US 8,839,222 B1
(45) Date of Patent: Sep. 16, 2014

(54) SELECTING UPDATES FOR DEPLOYMENT TO A PROGRAMMABLE EXECUTION SERVICE APPLICATION

(75) Inventors: Eric J. Brandwine, Haymarket, VA (US); Joseph E. Fitzgerald, Seattle, WA (US); Marvin M. Theimer, Bellevue, WA (US); Benjamin W. Mercier, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 351 days.

(21) Appl. No.: 13/238,893

(22) Filed: Sep. 21, 2011

(51) Int. Cl.
*G06F 9/45* (2006.01)

(52) U.S. Cl.
USPC .......................................................... 717/168

(58) Field of Classification Search
USPC .......................................................... 717/168
See application file for complete search history.

(56) References Cited

U.S. PATENT DOCUMENTS

| 7,539,686 | B2 * | 5/2009 | Shepard et al. ........................ 1/1 |
| 2005/0171831 | A1 * | 8/2005 | Johnson et al. ................. 705/10 |
| 2005/0172269 | A1 * | 8/2005 | Johnson et al. ............... 717/124 |
| 2012/0278902 | A1 * | 11/2012 | Martin et al. .................... 726/28 |
| 2012/0311534 | A1 * | 12/2012 | Fox et al. ....................... 717/120 |

* cited by examiner

*Primary Examiner* — John Chavis
(74) *Attorney, Agent, or Firm* — Hope Baldauff, LLC

(57) ABSTRACT

A test environment is created for use in selecting updates for deployment to a programmable execution service ("PES") application. The test environment is created in one embodiment by replicating a production network and one or more production virtual machine instances executing the PES application. Once the test environment has been created, the test environment is utilized to test and select updates for deployment to the PES application. The updates may be selected by deploying the updates to the test environment and using the test environment to determine whether the deployed updates are compatible with the PES application, permit the PES application to continue to operate performantly, and/or permit the PES application to meet one or more business performance metrics. Once the updates have been selected, the updates may be applied to production virtual machine instances executing the PES application.

26 Claims, 6 Drawing Sheets

SELECTING UPDATES FOR DEPLOYMENT TO A PROGRAMMABLE EXECUTION SERVICE APPLICATION

BACKGROUND

A programmable execution service ("PES") can provide computing resources for executing applications on a permanent or an as-needed basis. The computing resources provided by a PES may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including World Wide Web ("Web") servers, application servers, media servers, database servers, and the like. The resources provided by a PES can typically be purchased and utilized according to various financial models.

Applications executing on a PES ("PES applications") can be highly complex. For instance, it is not uncommon for such applications to be configured to execute many hundreds of different types of services on a thousand or more instances. It is also not uncommon for PES applications to utilize software components that are developed internally by the owner or maintainer of the PES application, software components developed by the open source community, and/or software components licensed from a third-party provider. As a result, many different software developers and/or software development teams might concurrently maintain and develop updates to the various components that make up a PES application. Updates to a PES application might implement security patches, bug fixes, feature improvements, or make other changes. Updates might install new software components, patch existing software components, remove software components from a PES application, and/or perform other tasks.

As a result of the complexity of many PES applications and the fact that updates to components utilized by PES applications might be issued by many different developers, it can be difficult for the owner or maintainer of a PES application to determine the applicability and compatibility of the various updates. Consequently, it may be hard for the owner or maintainer of the PES application to determine which updates to deploy to a PES application. This is especially true for high-availability PES applications for which downtime is unacceptable. The possibility of downtime caused by the deployment of an incompatible update typically outweighs the possible benefits that might result from the deployment of an update to the PES application. As a result, updates to PES applications may be declined or postponed out of fear that the deployment of the updates might negatively affect the performance of the PES application.

It is with respect to these and other considerations that the disclosure made herein is presented.

DETAILED DESCRIPTION

Figure 1:
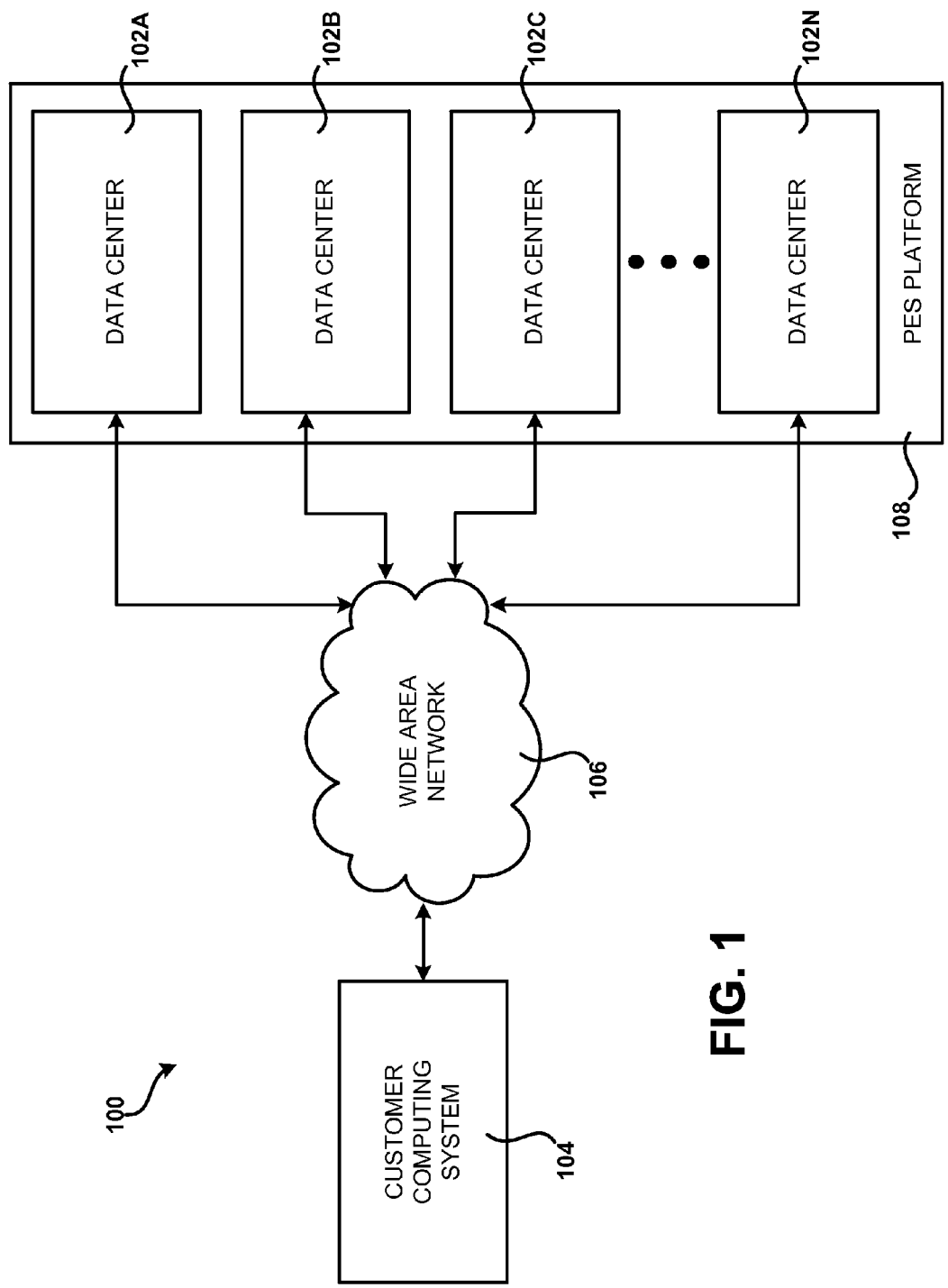
FIG. 1 is a system and network diagram showing aspects of one illustrative operating environment for the embodiments disclosed herein for selecting updates for deployment to a PES application.

The following detailed description is directed to technologies for selecting updates for deployment to a PES application. Utilizing the technologies described herein, updates can be selected for deployment to an application, such as an application executing on a PES, in a way that helps ensure that updates are compatible with the application and that the application will continue to operate performantly and meet expected business goals. Additionally, updates can be selected for deployment to PES applications utilizing the mechanisms disclosed herein with greatly reduced risk of application downtime.

According to one aspect disclosed herein, a PES platform is configured to provide instances of computing resources for executing a PES application. For example, the PES platform might provide virtual machine instances ("instances") for executing an application, such as an e-commerce application or another type of distributed application. Software components that implement the PES application are deployed to the virtual machine instances provided by the PES platform. As discussed above, PES applications might be implemented by many different components executing on many different instances.

The PES platform is also provided with functionality for selecting updates to be applied to the components of the PES application and for deploying the selected updates. As discussed above, it may be necessary to periodically apply software updates to various components of a PES application to implement security patches, bug fixes, feature improvements, or for other reasons. An update might install new software components, patch existing software components, remove software components from the application, and/or perform other tasks. An update might install or modify components executing on a single or multiple instances and, therefore, might effect the operation a PES application that executes utilizing components on many different instances.

In order to select updates for deployment to a PES application, an update evaluation component, a deployment component, or another component creates or identifies a test environment for use in identifying updates that are suitable for deployment to the PES application. In one embodiment, the test environment is created by programmatically replicating a production network and production instances executing the PES application. A production network is a network that is receiving live network traffic destined for the production instances. For instance, in the case of an e-commerce application, the production network receives actual network traffic from customers of the e-commerce application. By programmatically replicating the production network, a replicated network is created under software control that receives a copy of the traffic received by the production network. An instance is a production instance while its primary function is to act according to the design of the PES application. For instance, a production instance might handle live network traffic received on the production network.

Other resources utilized by the PES application, such as database resources, might also be replicated and utilized as a part of the test environment. In this manner, a copy of the application and its dependent resources, including incoming network traffic, is created. By testing the applicability, compatibility, and cost/benefit of updates to a PES application on the replicated instances, the possibility of downtime to the production instances may be reduced or even eliminated.

According to another embodiment, the test environment includes a production network and production instances. As mentioned above, the production network and instances receive live incoming network traffic. Consequently, performing the processes described herein for selecting updates to be applied to a PES application on production instances might result in downtime to the production instances. As a result, the processes described herein for selecting updates might be performed incrementally when production instances are utilized in the test environment. For instance, updates might be initially deployed and tested on a relatively small number of instances. If the updates are compatible with the PES application and operate performantly, the updates might be deployed to a greater number of instances. If the updates appear to be incompatible with the PES application or do not provide a desired level of performance, the updates to the PES application might be removed from the production instances.

In another embodiment, the test environment includes a test network and test instances. An instance is a test instance while its primary function is to test a potential update to a PES application. The test network is also created for performing the processes described herein for selecting updates for deployment to the PES application. Live network traffic received on a production network might be recorded and replayed on the test network to simulate actual network traffic to the test instances. As with the replicated network and instances described above, the test network and test instances do not receive actual live network traffic and, therefore, there is no risk of downtime to a production PES application as a result of performing the processes described herein for selecting updates on the test network and test instances.

In view of the above, it should be appreciated that a production instance might also be a test instance, or become a test instance temporarily. It should also be appreciated that the terms "replicated" or "replicate" as utilized herein encompass not only cloning an instance, but also repurposing an instance. For example, a production instance might be temporarily utilized as a test instance. In this example, the production instance is considered a test instance because it no longer receives live customer network traffic and because the instance is being utilized to test aspects of the operation of a PES application following the deployment of one or more updates.

After testing of an update, or updates, has completed, test instances might also be repurposed into production instances. In this manner, suitable updates can be "deployed" to the PES application by converted test instances into production instances that handle live network traffic. In this regard, it should be appreciated that, as used herein, the phrase "deploy an update" includes the conversion of a test instance into a production instance utilized by a PES application.

Once an appropriate test environment has been created, an update evaluation component utilizes the test environment to test and select updates for wide deployment to the PES application. In this regard, the update evaluation component may determine whether the updates are compatible with the PES application. To make this determination, the update evaluation component may determine whether the PES application is operating properly in the test environment following the deployment of the updates. If the PES application is not operating correctly, the updates may be considered incompatible with the PES application and not selected for deployment to production instances. If the PES application is operating correctly following deployment of the updates, the updates may be considered compatible with the PES application and selected for deployment to production instances executing the PES application.

In other embodiments, the update evaluation component might also determine whether the PES application is operating performantly in the test environment following the deployment of the updates. A system administrator might specify operating parameters of the PES application that are evaluated to determine whether the PES application is operating performantly. If the PES application does not operate performantly in the test environment following deployment of the updates, the updates may be considered unsuitable for deployment to production instances. If the PES application does operate performantly in the test environment following the deployment of the updates, the updates may be selected for deployment to production instances executing the PES application.

In other embodiments, when a production network and one or more production instances are utilized in the test environment, the update evaluation component might also determine whether the PES application executing in the test environment is meeting one or more business metrics following the deployment of the updates. A system administrator might define the business metrics that are evaluated by the update evaluation component. For instance, a system administrator might define gross sales by an e-commerce PES application as a business metric to be tested. If gross sales decline following application of the updates, then the updates may be considered unsuitable for wide deployment to production instances. If gross sales remain steady or improve, then the updates may be selected for deployment to the production instances. The update evaluation component might also evaluate other types of business metrics.

It should be appreciated that the determinations described above as to whether an update is compatible with a PES application, whether a PES application is operating performantly following the deployment of an update, and whether a PES application is meeting business metrics following the application of an update might be performed by evaluating one or more direct performance metrics and/or one or more indirect performance metrics.

Direct performance metrics are metrics that can be directly measured at an instance that has been changed by the deployment of an update. For instance, direct performance metrics might include CPU or network utilization, memory usage, or response latency of an instance. Direct performance metrics may correlate strongly to the installation of an update at a particular instance.

Indirect performance metrics are metrics that reflect aspects of the overall operation of a PES application, which may include the operation of many different components on many different instances. For instance, indirect performance metrics might include business metrics like the gross volume of orders received by an e-commerce PES application. Indirect performance metrics may correlate weakly to the installation of an update at one or more instances.

Once applicable, compatible, and performant updates have been selected by the update evaluation component using the test environment, a deployment component may deploy the selected updates to production instances. Additionally, or alternatively, the update evaluation component might generate a deployment report providing information regarding the compatibility and/or performance of tested updates. A system administrator might utilize the report to decide whether the updates should be deployed to the production instances. Such a report might also aid the administrator in scheduling modifications to the PES application to prepare the application for deployment of the updates.

According to other embodiments, multiple updates might be tested simultaneously to measure the mutual compatibility of multiple components. In this regard, updates might be tested in various combinations to determine the inter-compatibility of the updates. Reports might also be generated regarding the inter-compatibility of various updates and provided to a system administrator.

In another embodiment, component providers might annotate updates with required components and/or required or suggested versions of other components. In this embodiment, the update evaluation component may be configured to test updates on a PES application in the test environment once all required components have been updated to a required or suggested version.

In another embodiment, the updates may be components provided by a third-party component provider. In this embodiment, a third-party component provider may offer components for use with the PES application. The deployment component may provide functionality for allowing the third-party component provider to register components for use with the PES application. The components might be alternatives to other components provided by other component providers that perform similar functions. The deployment component may then deploy the component to a test environment in the manner described above.

The update evaluation component might also test the performance of the third-party component against various metrics. For instance, the update evaluation component might determine that the third-party component reduces network bandwidth, request latency, and/or licensing costs. In this regard, the update evaluation component might automatically deploy third-party components to production instances that increase performance or reduce costs by a certain threshold. The update evaluation component might also provide a report to an administrator indicating the reduction in costs and/or improvement in performance caused by the deployment of the third-party component. The administrator may utilize the report to determine whether the third-party component should be deployed to production instances.

In embodiments the processes described above for evaluating and deploying updates are triggered by a source code management system. For instance, in one embodiment the check-in of source code for an update to a source code management system causes the update evaluation component to test the update and to automatically deploy the update if the update is compatible with the PES and meets any other performance or business targets set by an administrator. The processes described above for evaluating and deploying updates might also be triggered in response to the availability of new updates or other events.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 that includes a PES platform 108 for executing a distributed application.

The PES platform 108 can provide computing resources for executing the application on a permanent or an as-needed basis. The computing resources provided by the PES platform 108 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, services, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The computing resources provided by the PES platform 108 are enabled by one or more data centers 102A-102N (which may be referred to herein singularly as "a data center 102" or in the plural as "the data centers 102"). The data centers 102 are facilities utilized to house and operate computer systems and associated components. The data centers 102 typically include redundant and backup power, communications, cooling, and security systems. The data centers 102 might also be located in geographically disparate locations. One illustrative configuration for a data center 102 that implements the concepts and technologies disclosed herein for selecting updates for deployment to a PES application will be described below with regard to FIG. 2.

The customers and other consumers of the PES platform 108 may access the computing resources provided by the data centers 102 over a wide-area network ("WAN") 106. Although a WAN is illustrated in FIG. 1, it should be appreciated that a local-area network ("LAN"), the Internet, or any other networking topology known in the art that connects the data centers 102 to remote consumers may be utilized. It should also be appreciated that combinations of such networks might also be utilized.

The customer computing system 104 is a computer utilized by a customer or other consumer of the PES platform 108. For instance, the customer computing system 104 may be a server computer, a desktop or laptop personal computer, a tablet computer, a wireless telephone, a personal digital assistant ("PDA"), an e-reader, a game console, a set-top box, or any other computing device capable of accessing the PES platform 108.

The customer computing system 104 may be utilized to access and configure aspects of the computing resources provided by the PES platform 108. In this regard, the PES platform 108 might provide a Web interface through which aspects of its operation may be configured through the use of a Web browser application program executing on the customer computing system 104. Alternatively, a stand-alone application program executing on the customer computing system 104 might access an application programming interface ("API") exposed by the PES platform 108 for performing the configuration operations. Other mechanisms for configuring the operation of the PES platform 108, including testing updates to a PES application, might also be utilized.

According to embodiments disclosed herein, the capacity of purchased computing resources provided by the PES platform 108 can be scaled in response to demand. In this regard, scaling refers to the process of instantiating (which may also be referred to as "launching" or "creating") or terminating (which may also be referred to as "de-scaling") instances of computing resources in response to demand. In this manner, the capacity of resources purchased by a customer of the PES platform 108 can be scaled on-demand.

Auto scaling is one mechanism for scaling computing resources in response to increases or lulls in demand for the resources. Auto scaling allows customers of the PES platform 108 to configure the platform 108 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand.

The PES platform 108 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources.

The deployment component might also provide functionality for assisting customers with the deployment of updates to existing instances of computing resources. Through this mechanism, a customer can indicate that an update, or updates, is to be applied to an application executing on the PES platform. In response thereto, the deployment component is configured to apply the update to the application in an optimized fashion that satisfies any business or technical requirements of the customer.

According to the various embodiments presented herein, the deployment component operates in conjunction with an update evaluation component. As will be described in greater detail below, the update evaluation component provides functionality for testing the applicability, compatibility, and performance of updates to a PES application prior to the wide deployment of the updates to production instances. Additional details regarding an update evaluation component utilized by the PES platform 108 that includes this functionality will be described below with regard to FIGS. 4-5. It should be appreciated that the functionality described herein as being performed by the deployment component might be performed by the update evaluation component and vice versa. Additionally, other components or systems might also perform the described functionality.

Figure 2:
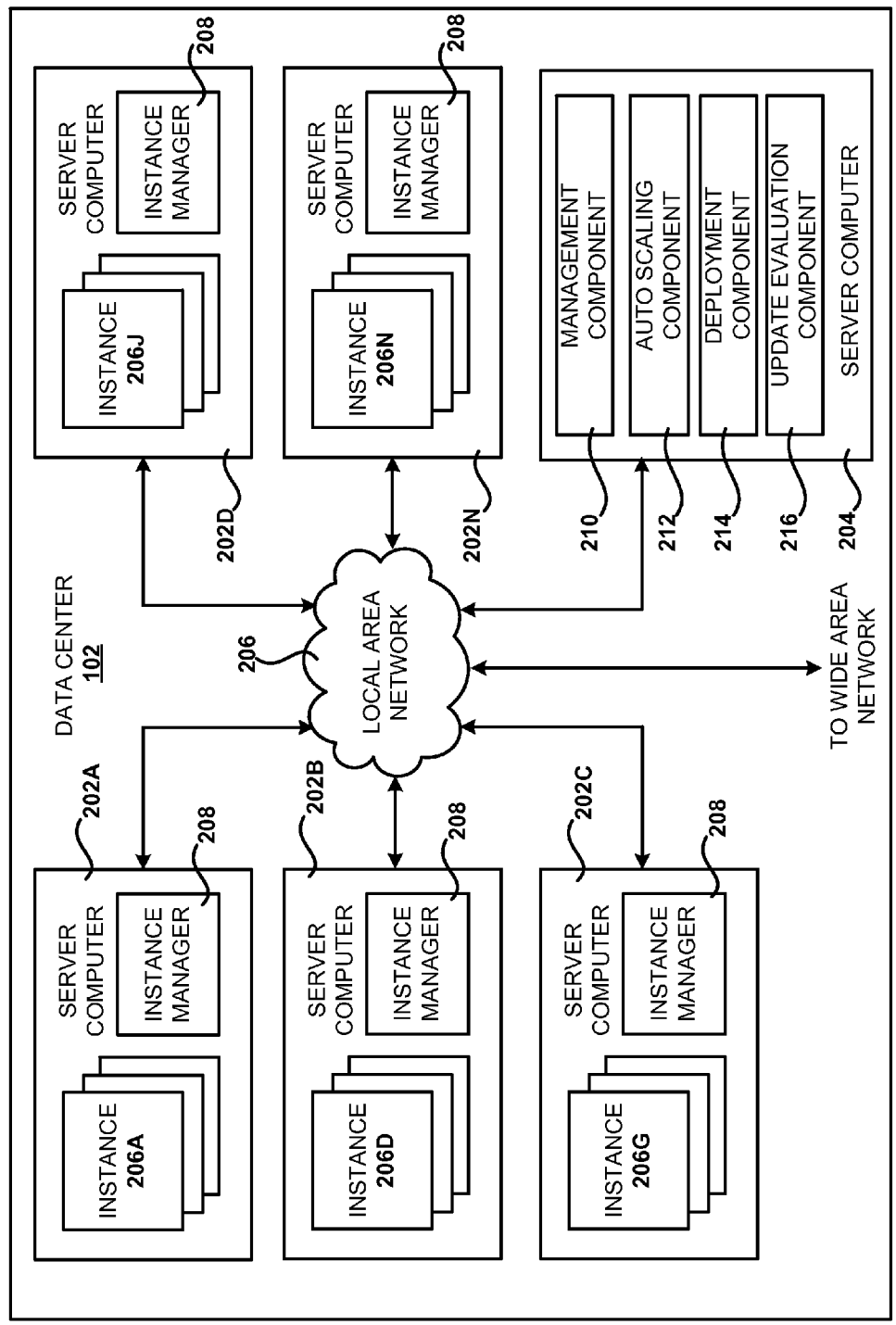
FIG. 2 is a computing system diagram that illustrates a configuration for a data center that implements the concepts and technologies disclosed herein for selecting updates for deployment to a PES application according to one embodiment.

FIG. 2 is a computing system diagram that illustrates one configuration for a data center 102 that implements a PES platform 108, including an implementation of the concepts and technologies disclosed herein for selecting updates for deployment to an application executing on the PES platform 108. The example data center 102 shown in FIG. 2 includes several server computers 202A-202N (which may be referred herein singularly as "a server computer 202" or in the plural as "the server computers 202") for providing computing resources for executing an application. The server computers 202 may be standard server computers configured appropriately for providing the computing resources described above. For instance, in one implementation the server computers 202 are configured to provide instances 206A-206N of computing resources.

In one embodiment, the instances 206A-206N (which may be referred to herein singularly as "an instance 206" or in the plural as "the instances 206") are virtual machine instances. As known in the art, a virtual machine instance is an instance of a software implementation of a machine (i.e. a computer) that executes programs like a physical machine. In the example of virtual machine instances, each of the servers 202 may be configured to execute an instance manager 208 capable of executing the instances. The instance manager 208 might be a hypervisor or another type of program configured to enable the execution of multiple instances 206 on a single server 202, for example. As discussed above, each of the instances 206 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

The data center 102 shown in FIG. 2 also includes a server computer 204 reserved for executing software components for managing the operation of the data center 102, the server computers 202, and the instances 206. In particular, the server computer 204 might execute a management component 210. As discussed above, a customer of the PES platform 108 might utilize the customer computing system 104 to access the management component 210 to configure various aspects of the operation of PES platform 108 and the instances 206 purchased by the customer. For example, the customer may purchase instances and make changes to the configuration of the instances. The customer might also specify settings regarding how the purchased instances are to be scaled in response to demand. The customer might also indicate that the processes described herein for selecting updates to a PES application should be performed.

The auto scaling component 212 scales the instances 206 based upon rules defined by a customer of the PES platform 108. For instance, the auto scaling component 212 might allow a customer to specify scale up rules for use in determining when new instances should be instantiated and scale down rules for use in determining when existing instances should be terminated.

As discussed briefly above, the data center 102 is also configured with a deployment component 214 to assist customers in the deployment of new instances 206 of computing resources. The deployment component 214 may receive a configuration from a customer that includes data describing how new instances 206 should be configured. For example, the configuration might specify one or more applications that should be installed in new instances 206, provide scripts and/or other types of code to be executed for configuring new instances 206, provide cache warming logic specifying how an application cache should be prepared, and other types of information.

The deployment component 214 also provides functionality for deploying updates to an application. In this regard, the management component 210 might be configured to allow a customer to declare that one or more updates are available for an application and to provide update preferences indicating various factors regarding when and how the update should be performed. As mentioned above, the deployment component 214 may also provide the functionality disclosed herein for testing updates prior to wide-scale deployment to production instances executing a PES application. Additional details regarding this process and other functionality provided by the deployment component 214 will be provided below with regard to FIGS. 4-5.

As illustrated in FIG. 2, the data center 102 might also be configured with an update evaluation component 216. As described briefly above, the update evaluation component 216 operates in conjunction with the deployment component 214 to test the applicability, compatibility, and performance of updates to a PES application. Details regarding the operation of the update evaluation component 216 will be provided below with regard to FIGS. 4-5.

In the example data center 102 shown in FIG. 2, an appropriate LAN 206 is utilized to interconnect the server computers 202A-202N and the server computer 204. The LAN 206 is also connected to the WAN 106 illustrated in FIG. 1. It should be appreciated that the network topology illustrated in FIGS. 1 and 2 has been greatly simplified and that many more networks and networking devices may be utilized to interconnect the various computing systems disclosed herein. Appropriate load balancing devices or software modules might also be utilized for balancing a load between each of the data centers 102A-102N, between each of the server computers 202A-202N in each data center 102, and between instances 206 purchased by each customer of the PES platform 108. These network topologies and devices should be apparent to those skilled in the art.

It should be appreciated that the data center 102 described in FIG. 2 is merely illustrative and that other implementations might be utilized. In particular, functionality described herein as being performed by the management component 210, the auto scaling component 212, the deployment component 214, and the update evaluation component 216 might be performed by other components or by a combination of these or other components. Additionally, it should be appreciated that this functionality might be implemented in software, hardware, or a combination of software and hardware. Other implementations should be apparent to those skilled in the art.

Figure 3:
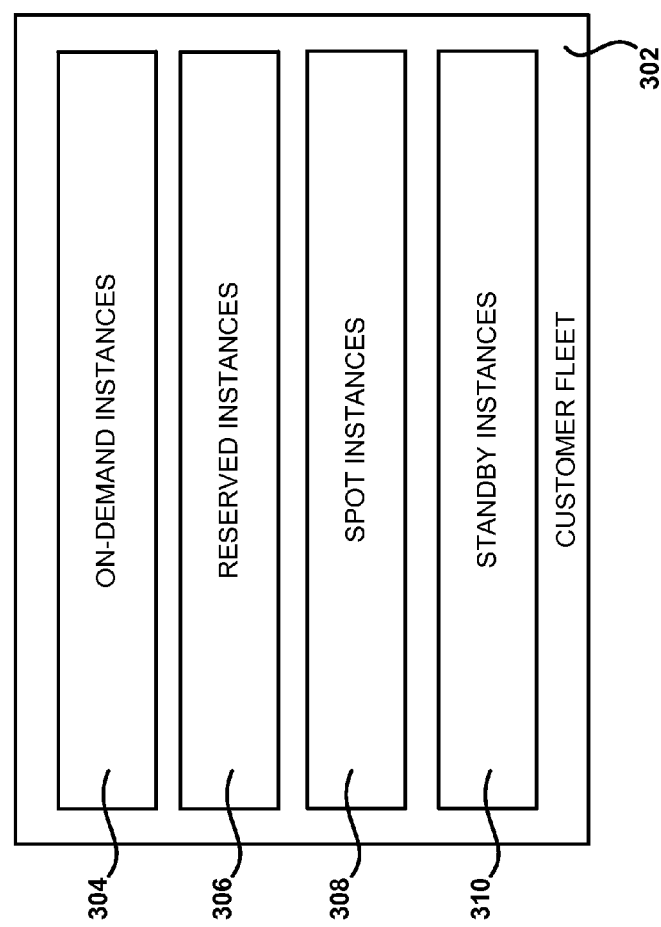
FIG. 3 is a block diagram illustrating various types of instances of computing resources that might be found in a customer fleet utilized to implement a PES application, according to embodiments disclosed herein.

FIG. 3 is a block diagram illustrating several types of instances 206 of computing resources that might be utilized in a customer fleet 302 to implement a PES application, according to embodiments disclosed herein. As used herein, the term "fleet" refers to all of the instances purchased and/or operated by a customer of the PES platform 108. As shown in FIG. 3, the instances provided by the PES platform 108 may be on-demand instances 304, reserved instances 306, spot instances 308, and standby instances 310. Other types of instances not shown in FIG. 3 or described herein might also be provided.

The on-demand instances 304, which might also be referred to herein as "regular" instances, are instances that are paid for and in active use by a customer. The on-demand instances 304 allow customers of the PES platform 108 to pay for capacity per unit of time, such as an instance-hour, without requiring a long-term commitment. This frees the customer from the costs and complexities of planning, purchasing, and maintaining hardware and transforms what are commonly large fixed costs into much smaller variable costs.

The reserved instances 306 are instances of a computing resource that are reserved for a customer in exchange for a payment. The reserved instances 306 provide the customer the option to make a one-time payment for each instance they want to reserve. In turn, the customer may receive a significant discount on the hourly usage charge for the reserved instances 306 as compared to the on-demand instances 304. After the customer makes a one-time payment for the reserved instances 306, the reserved instances 306 are reserved for the customer and the customer has no further obligation. The customer may choose to run the reserved instances 306 for the discounted usage rate for the duration of a chosen term. If the customer does not use the reserved instances 306, the customer will not pay usage charges on these instances.

The spot instances 308 allow customers to bid on unused capacity in the PES platform 108. The customer can run the spot instances 308 for as long as their bid exceeds a current market price, referred to herein as the spot instance market price, which may fluctuate based upon supply and demand. The spot instances 308 may be terminated if a customer's maximum bid no longer exceeds the current spot instance market price.

In order to obtain the spot instances 308, the customer places a request for the spot instances 308 that specifies the desired number of spot instances 308 and the maximum price the customer is willing to pay per instance hour. If the customer's maximum price bid exceeds the current spot instance market price for the spot instances 308, the customer's request will be fulfilled and the customer's spot instances 308 will run until either the customer chooses to terminate them or the market price increases above the customer's maximum price (whichever is sooner). Various components operating within the PES platform 108 may manage the market for the spot instances 308, including setting the current spot instance market price for the spot instances 308.

The standby instances 310 are spot instances 308 that have been acquired on behalf of a customer and that are made ready for near immediate use by the customer in the manner described herein. The price charged for the standby instances 310 is typically less than the price charged for the on-demand instances 304, since the standby instances 310 may be terminated in the same manner as the spot instances 308. In one embodiment, the standby instances 310 are priced higher than the spot instances 308 and the reserved instances 306, but lower than the on-demand instances 304. It should be appreciated, however, that the various pricing mechanisms described above for the on-demand instances 304, reserved instances 306, spot instances 308, and standby instances 310 are merely illustrative and that other mechanisms may be utilized to set the pricing for the various instance types.

Figure 4:
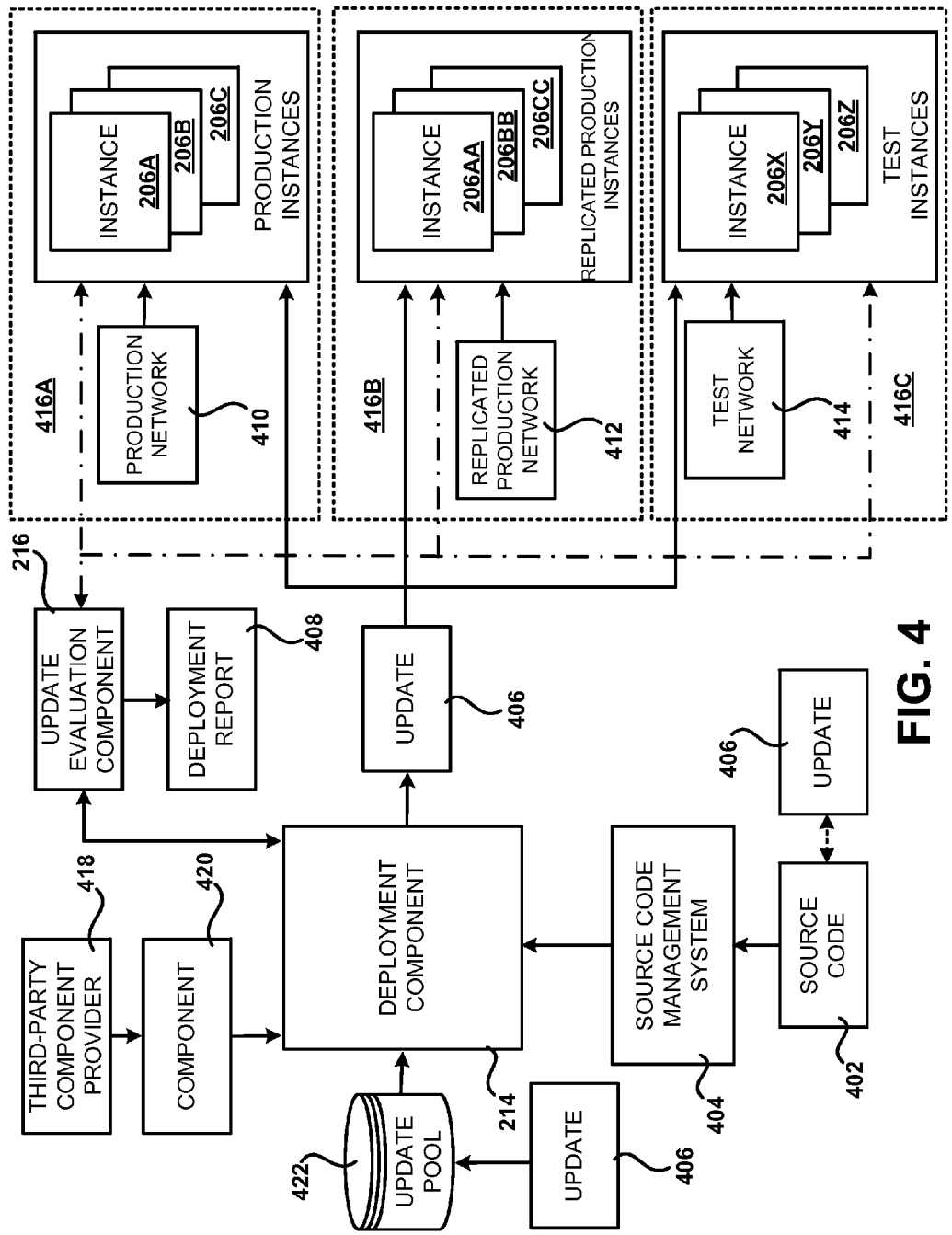
FIG. 4 is a computing system diagram showing aspects of the various embodiments disclosed herein for selecting updates for deployment to a PES application.

FIG. 4 is a computing system diagram showing aspects of the operation of a deployment component 214 and an update evaluation component 216 utilized in various embodiments disclosed herein for selecting and deploying updates to an application within the PES platform 108. As discussed briefly above, the deployment component 214 provides functionality for deploying an application and for deploying updates to the application. As also discussed above, the update evaluation component 216 provides functionality for testing and selecting updates to a PES application prior to wide-scale deployment of the updates. The functionality described herein as being performed by the deployment component 214 might be provided by the update evaluation component 216 or another component, combination of components, or system. Similarly, the functionality described herein as being performed by the update evaluation component 216 might be performed by the deployment component 214 or another component, combination of components, or system.

In one embodiment disclosed herein, the management component 210 is configured to provide functionality for allowing an owner or maintainer of an application to declare that an update 406, or updates, is available for the application. As discussed above, the update 406 might install new software components into the application, may patch existing software components in the application, may remove software components from the application, and/or perform other tasks for updating the components of the application.

In one embodiment, an update 406 is declared available for the application by placing the update 406 into an update pool 422. For instance, the developer of an update might place an update into the update pool 422, thereby indicating that the update is ready for testing and deployment to the PES application. In one embodiment, an update 402 is placed into the update pool 422 in response to the check in of source code 402 to a source code management system. A third-party component provider 418 might also place updates into the update pool. Other mechanisms might also be provided to enable updates to be placed into the update pool 422.

The update pool 422 is a data store that stores updates prior to deployment to a PES application. The deployment component 214 might continually or periodically examine the contents of the update pool 422 to determine when new updates 406 are available. In this way, the addition of an update 406 to the update pool 422 might trigger the processes described herein for testing the update 406 with the PES application and deploying the update 406 to the PES application automatically if the update 406 meets certain criteria. This process might be repeated continually, periodically, or on another schedule in order to automatically evaluate and roll out compatible and performant updates to the PES application.

In response to receiving an indication from an owner or maintainer of an application that an update 406 is available for deployment, the deployment component 214 and the update evaluation component 216 might perform the processes described herein for determining whether the update 406 is suitable for deployment to the application. In other embodiments, the functionality presented herein might be performed in response to other events, like the check-in of source code 402 for an update 406 to the application to a source code management system 404, or in response to other events.

In order to select the updates for deployment to the application, the update evaluation component 216 is configured to first create or identify a test environment 416 for performing the processes described herein. In one embodiment, the update evaluation component 216 causes a test environment 416B to be created by programmatically replicating a production network 410 and production instances 206A-206C executing the PES application. As mentioned briefly above, the production network 410 is a network that is receiving live network traffic destined for the production instances 206A-206C. In the case of an e-commerce application, for example, the production network 410 receives actual network traffic from customers of the e-commerce application. The production instances 206A-206C are instances that handle the live network traffic received on the production network 410.

By programmatically replicating the production network 410 for use in the test environment 416B, a replicated production network 412 is created that receives a copy of the traffic received by the production network 410. The replicated production instances 206AA-206CC are replicas of the production instances 206A-206C. Other resources utilized by the PES application, such as database resources, might also be replicated. In this manner, the replicated production instances 206AA-206CC receive identical network input to the production instances 206A-206C, and receive identical responses from dependent network resources, but are in fact receiving a copy or "echo" of those responses.

By performing the processes described herein for selecting updates for deployment to an application on a test environment 416B that includes a replicated production network 412 and replicated production instances 206AA-206CC, the possibility of downtime to the production instances 206A-206C may be reduced or even eliminated. One mechanism for programmatically replicating a network is described in U.S. patent application Ser. No. 12/978/995, which was filed on Dec. 27, 2010, and entitled "Programmatically Provisioning Virtual Networks," which is expressly incorporated herein by reference in its entirety.

According to another embodiment, the update evaluation component 216 utilizes a test environment 416A that includes a production network 410 and production instances 206A-206C. As mentioned above, the production network 410 and instances 206A-206C receive live incoming network traffic. As a result, installing and testing updates on the production instances 206A-206C might result in downtime to the production instances 206A-206C.

In order to minimize any negative consequences of the processes presented herein on the production instances 206A-206C, the processes for selecting updates described herein might be performed incrementally when a test environment 416A is utilized that includes production instances 206A-206C. For example, updates might be initially deployed and tested on a relatively small number of production instances 206A-206C. If the updates operate satisfactorily, the updates might be deployed to a greater number of production instances 206A-206C. If the updates do not execute properly or do not provide any desired benefits, the deployment of the updates to the production instances 206A-206C might be rolled back.

In another embodiment, the update evaluation component 216 utilizes a test environment 416C that includes a test network 414 and test instances 206X-206Z. The test instances 206X-206Z are instances that are created for the purpose of testing updates to the PES application. The test network 414 is also created for testing the performance of updates to the PES application. Live network traffic received on the production network 410 might be recorded and replayed on the test network 414 to simulate actual network traffic to the test instances 206X-206Z. As with the replicated network 412 and instances 206AA-206CC described above, the test network 414 and instances 206X-206Z do not receive actual live network traffic and, therefore, there is no risk of downtime to a production PES application as a result of testing updates on the test network 414 and test instances 206X-206Z.

Once the update evaluation component 216 has created or identified an appropriate test environment 416, the update evaluation component 216 utilizes the test environment to select updates for deployment to the PES application. In this regard, the update evaluation component 216 may determine whether an update 406 is compatible with the PES application. To make this determination, the evaluation component 216 may determine whether the PES application is operating properly in the test environment 416 following the deployment of the update 406. The update evaluation component 216 might evaluate one or more direct metrics and/or one or more indirect metrics to determine if the PES application is operating properly.

If the PES application is not operating correctly, the update 406 may be considered to be incompatible with the PES application and not selected for deployment to the production instances 206A-206C. If the PES application is operating correctly following deployment of the update 406, the update 406 may be considered compatible with the PES application and selected for deployment to the production instances 206A-206C executing the PES application.

In other embodiments, the update evaluation component 216 might also determine whether the PES application is operating performantly in the test environment 416 following the deployment of the update 406. A system administrator might specify operating parameters of the PES application that are evaluated to determine whether the PES application is operating performantly. For instance, the system administrator might specify one or more direct metrics and/or one or more indirect metrics that should be evaluated to determine if the PES application is operating performantly.

If the PES application does not operate performantly in the test environment 416 following deployment of the update 406, the update 406 may be considered unsuitable for deployment to the production instances 206A-206C. If the PES application does operate performantly in the test environment 416 following the deployment of the update 406, the update 406 may be selected for deployment to the production instances 206A-206C executing the PES application.

In other embodiments where a production network 410 and one or more production instances 206A-206C are utilized in the test environment 416A, the update evaluation component 216 might also determine whether the PES application executing in the test environment 416A is meeting one or more business metrics following the deployment of the update 406. A system administrator might define the business metrics that are evaluated by the update evaluation component 216. For instance, the system administrator might define one or more indirect metrics that should be evaluated to determine whether certain business goals for the PES application are being met.

As an example, a system administrator might define gross sales by an e-commerce PES application as a business metric to be tested. If gross sales decline following deployment of the update 406, then the update 406 may be considered unsuitable for wide deployment to the production instances 206A-206C. If gross sales remain steady or improve, then the update 406 may be selected for deployment to the production instances 206A-206C. Other types of indirect metrics might also be evaluated by the update evaluation component 216.

Once the update evaluation component 216 has selected an update 406 for deployment to the PES application, the deployment component 214 may cause the update 406 to be deployed to the production instances 206A-206C. In this manner, the update evaluation component 216 can utilize a test environment 416B or 416C to test the compatibility and performance of the update 406 without impacting the production instances 206A-206C. When an update 406 has been selected for deployment, the deployment component 214 can deploy the selected update 406 to the production instances 206A-206C.

In another embodiment, the update evaluation component 216 generates a deployment report 408 in addition to or instead of automatically rolling out updates to the production instances 206A-206C. The deployment report 408 includes data describing the compatibility and performance of the tested updates. A system administrator might utilize the report to decide whether updates should be deployed to the production instances 206A-206C. The deployment report 408 might also include data indicating why a particular update, or updates, was deemed unsuitable for deployment to the PES application. A developer might utilize this information to modify the update. The developer might then submit the modified update to the update pool 422.

Although only a single update 406 has been illustrated in FIG. 4, it should be appreciated that multiple updates 406 might be tested simultaneously to measure the mutual compatibility of multiple components. In this regard, multiple updates 406 might be tested in various combinations to determine the inter-compatibility of the updates. The update evaluation component 216 might also generate reports that include data specifying the inter-compatibility of various updates 406 and provide the reports to a system administrator.

In another embodiment, component providers might annotate updates 406 with required components and/or required or suggested versions of other components. In this embodiment, the update evaluation component 216 may be configured to test updates on a PES application in the test environment 416 once all required components have been updated to a required or suggested version.

In yet another embodiment, the update 406 is a component 420 provided by a third-party component provider 418. In this embodiment, the third-party component provider 418 offers components for use with the PES application. The deployment component 214 and/or the update evaluation component 216 also provides functionality for allowing the third-party component provider 418 to register components 420 for use with the PES application. The component 420 might be an alternative to other components provided by other component providers that perform similar functions. The deployment component 214 and/or the update evaluation component 216 may receive the component 420 from the third-party component provider 418 and deploy the component 420 to a test environment 416B or 416C in the manner described above. In other embodiments, the third-party component provider 418 may utilize a Web site or other mechanism to indicate the availability of the component.

The update evaluation component 216 might also test the performance of the third-party component 420 against various metrics. For instance, the update evaluation component 216 might determine that the third-party component 420 reduces network bandwidth, request latency, licensing costs, or other operating factors. In this regard, the update evaluation component 216 might cause a third-party component 420 to be automatically deployed to production instances 206A-206C that increase performance or reduce costs by a certain threshold. The update evaluation component 216 might also provide a report to an administrator indicating the reduction in costs and/or improvement in performance caused by the deployment of the third-party component 420. The administrator may utilize the report to determine whether the third-party component 420 should be deployed to production instances 206A-206C. One mechanism for utilizing third-party software components is described in U.S. patent application Ser. No. 12/980,214, which was filed on Dec. 28, 2010, and entitled "Managing Use of Software Components," and which is expressly incorporated herein by reference in its entirety.

It should be appreciated that the determinations described above as to whether updates are compatible, performant, and/or satisfy one or more metrics may be made at a specific point in time. Alternatively, these determinations may be made over a period of time. For instance, the factors identified above might be evaluated over the course of a day, week, month, or other period of time to evaluate the impact of one or more updates on the PES application. An administrator might specify the period of time that one or more updates are to be evaluated over. If the updates meet the specified requirements over the specified period of time, then the updates may be deployed to production instances. Otherwise, the updates may not be deployed to production instances or may be rolled back if production instances are utilized to test the updates.

To further illustrate the process of evaluating updates over time, consider a scenario in which three updates (referred to as U1, U2, and U3) are deployed at one point in time and three other updates (referred to as U4, U5, and U6) are deployed at another point in time. If a problem is detected at some point following the deployment of the updates, six separate test environments may be created to test the operation of the PES application following the roll back of each of the updates U1-U6. If, for example, the PES application operates in the test environments acceptably following the rollback of U4 and U5, another test environment might be created in which both U4 and U5 are rolled back and the operation of the PES application in this test environment may be tested. If the PES application operates acceptably in the test environment following the rollback of both U4 and U5, then U4 and U5 might be rolled back on the production instances. In this manner, a test environment may be utilized to identify previously deployed updates that are operating incorrectly and to roll back the updates from the production instances.

Figure 5:
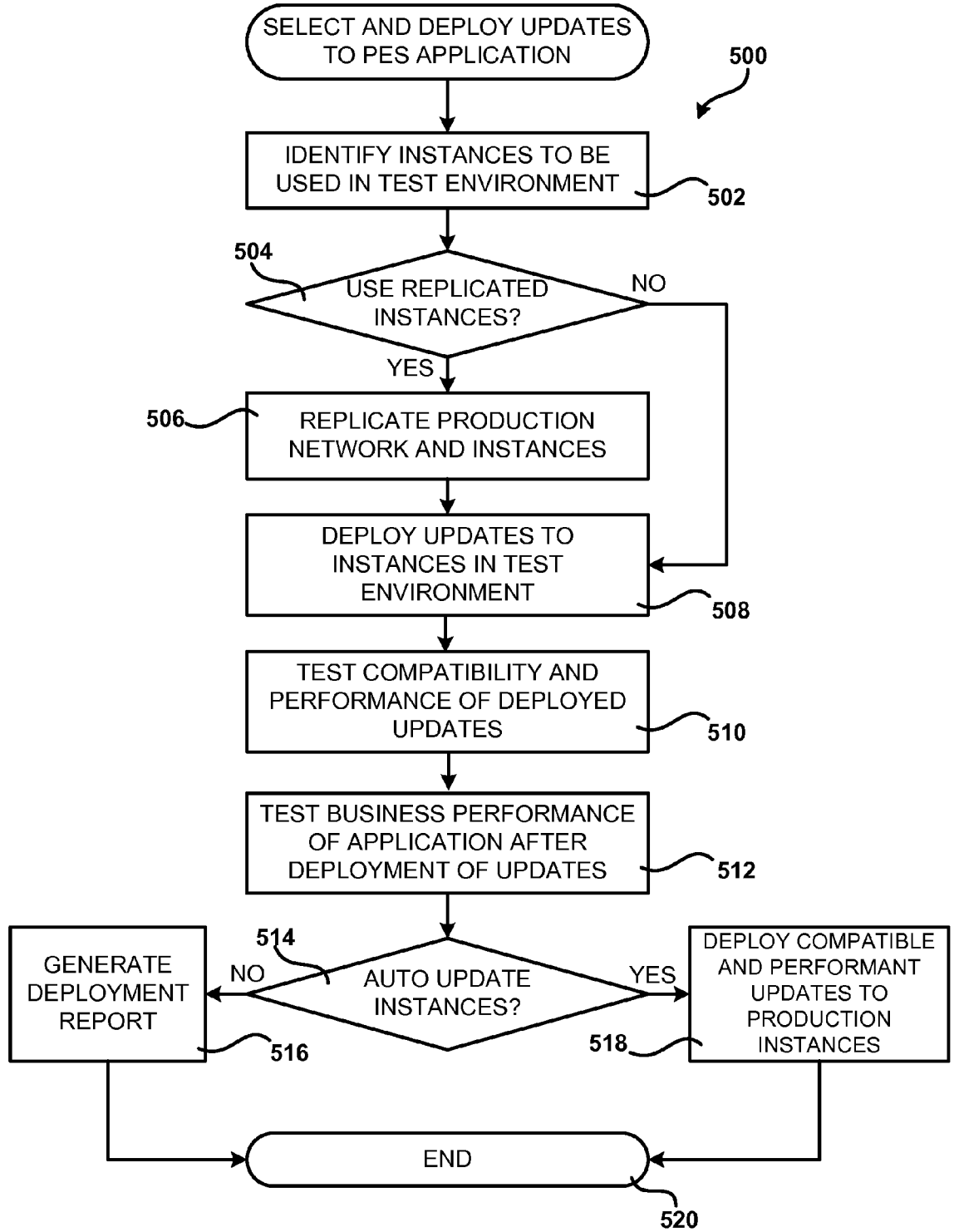
FIG. 5 is a flow diagram showing one illustrative routine for selecting updates for deployment to a PES application, according to one embodiment disclosed herein.

Turning now to FIG. 5, additional details will be provided regarding one illustrative process disclosed herein for selecting updates to an application executing on the PES platform 108. It should be appreciated that the logical operations described herein with respect to FIG. 5 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 is a flow diagram showing a routine 500 illustrating aspects of the operation of the deployment component 214 utilized in various embodiments disclosed herein for selecting updates for an application executing on the PES platform 108. In one embodiment, the operations illustrated in the routine 500 are performed by the update evaluation component 216 and the deployment component 214. It will be appreciated that other modules or components may also perform the routine 500, such as the management component 210. A combination of modules and components might also perform the operations illustrated in the routine 500.

As discussed above, the routine 500 might be performed in response to an update 406 being placed into the update pool 422. The routine 500 might also be performed in response to the check in of source code 402 for the update 406 to the source code management system 404. The routine 500 might also be performed in response to receiving an indication from a third-party component provider 418 that a component 420 is available for deployment. Other types of events might also trigger the performance of the routine 500, such as the discovery of an update 406 on a Web site, on a file server, receipt of an update via e-mail or another electronic communications mechanism, and others.

The routine 500 begins at operation 502, where the update evaluation component 216 determines which instances are to be utilized in the test environment 416. For instance, the update evaluation component 216 might determine whether production instances 206A-206C, replicated production instances 206AA-206CC, or test instances 206X-206Z are to be utilized. Once the instances to be utilized in the test environment have been identified, the routine 500 proceeds from operation 502 to operation 504.

At operation 504, the update evaluation component 216 determines whether replicated instances 206AA-206CC are to be utilized in the test environment 416. If so, the routine 500 proceeds to operation 506, where the update evaluation component 216 causes the production network 410 to be replicated into the replicated production network 412. The update evaluation component 216 also causes the production instances 206A-206C to be replicated into the replicated production instances 206AA-206CC. In this manner, the test environment 416B is created. This process was described in additional detail above.

From operation 506, the routine 500 proceeds to operation 508 where the deployment component 214 deploys an update 406, or updates, to the test environment 416. Once the update 406, or updates, has been deployed to the appropriate test environment 416, the routine 500 proceeds from operation 508 to operation 510.

At operation 510, the update evaluation component 216 determines whether the deployed update 406 is compatible with the PES application. To make this determination, the update evaluation component 216 may determine whether the PES application is operating properly in the test environment 416 following the deployment of the update 406. If the PES application is not operating correctly, the update 406 may be considered to be incompatible with the PES application and not selected for deployment to the production instances 206A-206C. If the PES application is operating correctly following deployment of the update 406, the update 406 may be considered compatible with the PES application and selected for deployment to the production instances 206A-206C executing the PES application.

At operation 510, the update evaluation component 216 might also determine whether the PES application is operating performantly in the test environment 416 following the deployment of the update 406. As discussed above, a system administrator might specify operating parameters of the PES application that are evaluated to determine whether the PES application is operating performantly. If the PES application does not operate performantly in the test environment 416 following deployment of the update 406, the update 406 may be considered unsuitable for deployment to the production instances 206A-206C. If the PES application does operate performantly in the test environment 416 following the deployment of the update 406, the update 406 may be selected for deployment to the production instances 206A-206C executing the PES application.

From operation 510, the routine 500 proceeds to operation 512, where the update evaluation component 216 tests the business performance of the PES application following the deployment of the update 406 to the test environment 416. As discussed above, for instance, the update evaluation component 216 might determine whether the PES application executing in the test environment 416 is meeting one or more business metrics following the deployment of the update 406. If the business metrics are not met following deployment of the update 406, then the update 406 may be considered unsuitable for wide deployment to the production instances 206A-206C. If the business metrics are met, then the update 406 may be selected for deployment to the production instances 206A-206C. Other types of business metrics might also be evaluated by the deployment component.

The routine 500 then proceeds to operation 514, where the update evaluation component 216 determines whether the selected updates should be applied to the production instances 206A-206C without the involvement of an administrator. An administrator might specify whether compatible updates satisfying certain criteria should be automatically applied to the production instances 206A-206C or not.

If the updates are to be applied to the production instances 206A-206C, the routine 500 proceeds from operation 514 to operation 518 where the deployment component 214 deploys the selected updates to the production instances 206A-206C. Otherwise, the routine 500 proceeds from operation 514 to operation 516, where the deployment report 408, described above, is generated and provided to an administrator. From operations 516 and 518, the routine 500 proceeds to operation 520, where it ends.

Figure 6:
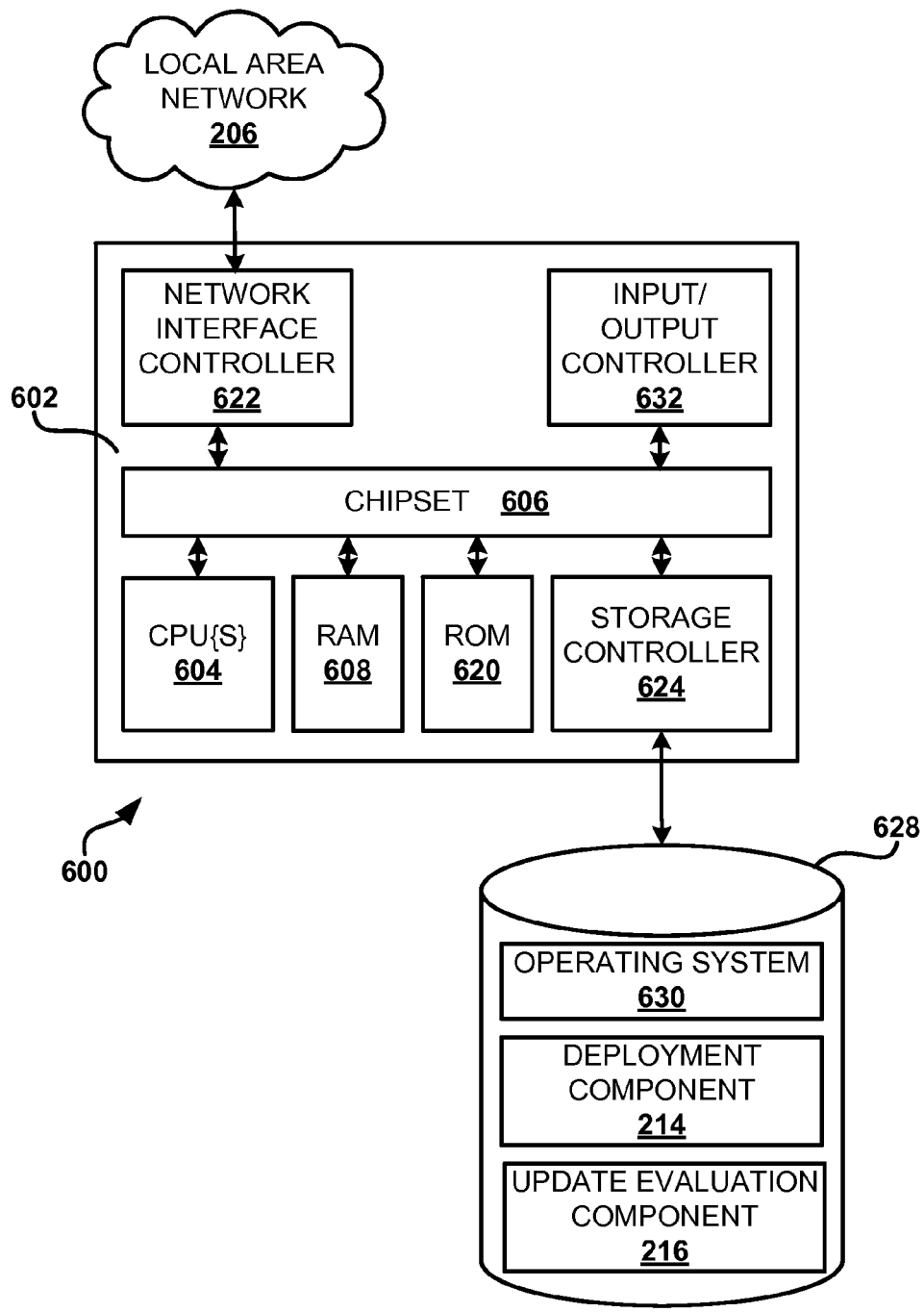
FIG. 6 is a computer architecture diagram showing an illustrative computer hardware architecture for implementing the various computing devices described in embodiments presented herein.

FIG. 6 shows an example computer architecture for a computer 600 capable of executing the software components described above. The computer architecture shown in FIG. 6 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing within the data centers 102A-102N, on the server computers 202A-202N, on the customer computing system 104, or on any other computing system mentioned herein.

The computer 600 includes a baseboard, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 are standard programmable processors that perform arithmetic and logical operations necessary for the operation of the computer 600.

The CPUs 604 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard. The chipset 606 may provide an interface to a random access memory ("RAM") 608, used as the main memory in the computer 600. The chipset 606 may further provide an interface to a computer-readable storage medium such as a read-only memory ("ROM") 620 or non-volatile RAM ("NVRAM") for storing basic routines that help to startup the computer 600 and to transfer information between the various components and devices. The ROM 620 or NVRAM may also store other software components necessary for the operation of the computer 600 in accordance with the embodiments described herein.

The computer 600 may operate in a networked environment using logical connections to remote computing devices and computer systems through the network 206. The chipset 606 may include functionality for providing network connectivity through a network interface controller ("NIC") 622, such as a gigabit Ethernet adapter. The NIC 622 is capable of connecting the computer 600 to other computing devices over the network 206. It should be appreciated that multiple NICs 622 may be present in the computer 600, connecting the computer to other types of networks and remote computer systems.

The computer 600 may be connected to a mass storage device 628 that provides non-volatile storage for the computer. The mass storage device 628 may store system programs, application programs, other program modules, and data, which have been described in greater detail herein. The mass storage device 628 may be connected to the computer 600 through a storage controller 624 connected to the chipset 606. The mass storage device 628 may consist of one or more physical storage units. The storage controller 624 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 may store data on the mass storage device 628 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 628 is characterized as primary or secondary storage, and the like.

For example, the computer 600 may store information to the mass storage device 628 by issuing instructions through the storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 628 by detecting the physical states or characteristics of one or more particular locations within the physical storage units.

In addition to the mass storage device 628 described above, the computer 600 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 628 may store an operating system 630 utilized to control the operation of the computer 600. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 628 may store other system or application programs and data utilized by the computer 600, such as the deployment component 214, the update evaluation component 216, and/or the other software components described above.

In one embodiment, the mass storage device 628 or other computer-readable storage media is encoded with computer-executable instructions which, when loaded into the computer 600, transforms the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the routine 500 described above with regard to FIG. 5.

The computer 600 may also include an input/output controller 632 for receiving and processing input from a number of input devices, such as a keyboard, a mouse, a touchpad, a touch screen, an electronic stylus, or other type of input device. Similarly, the input/output controller 632 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for selecting and deploying updates to an application executing on a PES platform 108 have been presented herein. It should be appreciated that although the embodiments disclosed herein have been described in the context of deploying updates to an application, the various aspects described herein might also be utilized to deploy updates to other types of software, such as operating systems.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for selecting and deploying updates to a programmable execution service ("PES") application, the method comprising performing computer-implemented operations for:
    maintaining an update pool comprising one or more updates to a PES application;
    selecting one or more updates to the PES application from the update pool;
    creating a test environment for use in determining whether the selected updates to the PES application are suitable for deployment by programmatically replicating a production network and one or more production virtual machine instances executing the PES application;
    deploying the selected updates to the PES application to the virtual machine instances in the test environment;
    determining based upon the operation of the virtual machine instances in the test environment whether the selected updates to the PES application are suitable for deployment to the PES application; and
    deploying the selected updates to the PES application to the one or more production virtual machine instances executing the PES application in response to determining that the one or more updates to the PES application are suitable for deployment to the PES application.

2. The computer-implemented method of claim 1, wherein determining based upon the operation of the virtual machine instances in the test environment whether the selected updates to the PES application are suitable for deployment to the PES application comprises determining whether the selected updates to the PES application are compatible with the PES application.

3. The computer-implemented method of claim 1, wherein determining based upon the operation of the virtual machine instances in the test environment whether the selected updates to the PES application are suitable for deployment to the PES application comprises:
    measuring one or more direct metric and one or more indirect metric related to the execution of the PES application; and determining based upon the one or more direct metric and the one or more indirect metric whether the selected updates to the PES application are suitable for deployment to the PES application.

4. The computer-implemented method of claim 1, further comprising:
   determining whether the PES application is operating performantly following the deployment of the selected updates to the PES application; and
   deploying the selected updates to the PES application to the one or more production virtual machine instances executing the PES application in response to determining that that the selected updates to the PES application are compatible with the PES application and that the PES application is operating performantly following the deployment of the one or more updates to the PES application.

5. The computer-implemented method of claim 4, further comprising:
   determining whether the PES application is meeting one or more business performance metrics following the deployment of the selected updates to the PES application; and
   deploying the selected updates to the PES application to the one or more production virtual machine instances in response to determining that that the selected updates to the PES application are compatible with the PES application, that the PES application is operating performantly following the deployment of the selected updates to the PES application, and that the PES application is meeting the business performance metrics following the deployment of the selected updates to the PES application.

6. The computer-implemented method of claim 1, wherein one or more of the updates comprises a component provided by a third-party component provider.

7. The computer-implemented method of claim 1, wherein the one or more updates to the PES application are selected and deployed in response to a check-in of source code to a source code management system for one or more of the updates.

8. The computer-implemented method of claim 1, wherein one or more test virtual machine instances in the test environment are created by converting one or more production virtual machine instances into the test virtual machine instances.

9. The computer-implemented method of claim 8, wherein the selected updates are deployed by converting one or more of the test virtual machine instance to production virtual machine instances.

10. A system for selecting updates to be deployed to a programmable execution service ("PES") application, the computer system comprising:
    a plurality of server computers executing one or more production instances executing the PES application; and
    a computer executing an update evaluation component configured to select one or more updates for deployment to the production instances by programmatically replicating one or more of the production instances and resources utilized by the production instances, periodically selecting one or more updates from an update pool, and utilizing the replicated instances and resources to determine whether the updates selected from the update pool are suitable for deployment to the production instances.

11. The system of claim 10, wherein the update evaluation component is further configured to cause the selected updates to be deployed to the one or more production instances in response to determining that the selected updates are suitable for deployment to the production instances.

12. The system of claim 10, wherein utilizing the replicated instances and resources to determine whether the updates selected from the update pool are suitable for deployment to the production instances comprises utilizing the replicated instances to determine if the updates selected from the update pool are compatible with the PES application.

13. The system of claim 10, wherein utilizing the replicated instances and resources to determine whether the updates selected from the update pool are suitable for deployment to the production instances comprises utilizing the replicated instances to determine if the PES application is operating performantly following the deployment of the selected updates to the PES application.

14. The system of claim 10, wherein utilizing the replicated instances and resources to determine whether the updates selected from the update pool are suitable for deployment to the production instances comprises utilizing the replicated instances to determine if the PES application is meeting one or more business performance metrics following the deployment of the selected updates to the PES application.

15. The system of claim 10, wherein the selected updates to the PES application are selected and deployed in response to a check-in of source code to a source code management system for one or more of the updates.

16. The system of claim 10, wherein one or more of the selected updates comprises a component provided by a third-party component provider.

17. A computer-readable storage medium having computer-executable instructions stored thereupon which, when executed by a computer, cause the computer to:
    create a test environment for use in determining whether an update is suitable for deployment to a programmable execution service ("PES") application, the test environment including one or more programmatically replicated resources;
    periodically select one or more updates from an update pool; and to
    utilize the created test environment to determine whether the selected updates are suitable for deployment to the PES application.

18. The computer-readable storage medium of claim 17, having further computer-executable instructions stored thereupon which, when executed by the computer, cause the computer to deploy the selected updates to one or more production instances executing the PES application in response to determining that the selected updates are suitable for deployment to the PES application.

19. The computer-readable storage medium of claim 17, wherein the programmatically replicated resources comprise one or more programmatically replicated production instances executing the PES application.

20. The computer-readable storage medium of claim 17, wherein the programmatically replicated resources further comprise a programmatically replicated network.

21. The computer-readable storage medium of claim 17, wherein utilize the created test environment to determine whether the selected updates are suitable for deployment to the PES application comprises:
    deploying the selected updates to the test environment; and
    determining whether the selected updates are compatible with the PES application based upon the performance of the PES application in the test environment following deployment of the selected updates.

22. The computer-readable storage medium of claim 17, wherein utilize the created test environment to determine whether the selected updates are suitable for deployment to the PES application comprises:
  determining whether the PES application operates performantly in the test environment following the deployment of the selected updates; and
  deploying the selected updates to the production instances if the selected updates are compatible with the PES application and the PES application is operating performantly in the test environment following the deployment of the selected updates.

23. The computer-readable storage medium of claim 17, wherein utilize the created test environment to determine whether the selected updates are suitable for deployment to the PES application comprises:
  determining whether the PES application is meeting one or more business metrics following the deployment of the selected updates to the test environment; and
  deploying the selected updates to the production instances if the selected updates are compatible with the PES application, the PES application is operating performantly in the test environment following the deployment of the selected updates, and the PES application is meeting the one or more business metrics.

24. The computer-readable storage medium of claim 17, wherein the selected updates to the PES application are deployed in response to a check-in of source code to a source code management system for the updates.

25. The computer-readable storage medium of claim 17, having further computer-executable instructions stored thereupon which, when executed by the computer, cause the computer to generate a deployment report having data stored therein describing the compatibility of the selected updates with the PES application.

26. The computer-readable storage medium of claim 17, wherein the selected updates comprise one or more components provided by a third-party component provider.

* * * * *